Sept. 20, 1949.   B. R. PURVIN   2,482,126
MACHINE TOOL CLAMPING MECHANISM
Original Filed Sept. 3, 1938   2 Sheets-Sheet 1
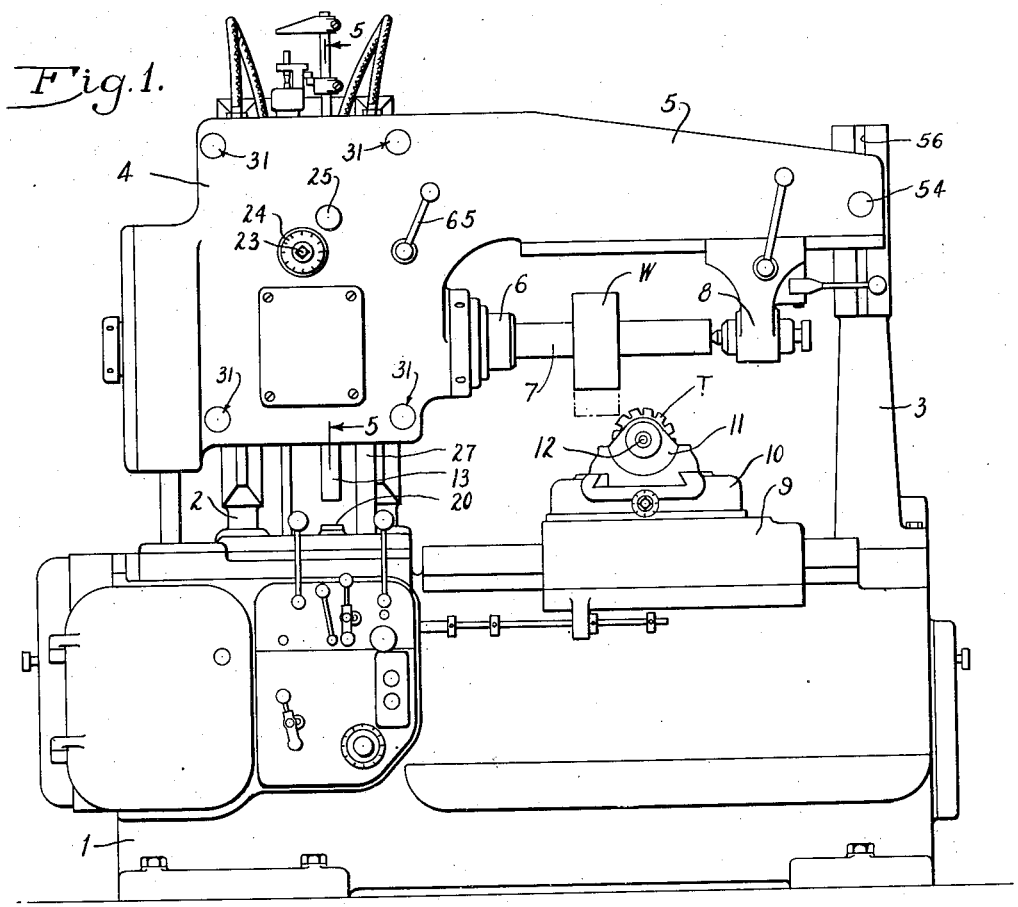
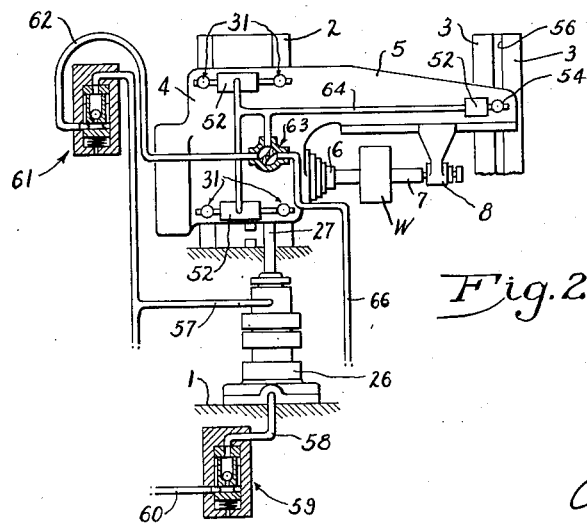
INVENTOR.
Benjamin R. Purvin
BY
ATTORNEYS Sept. 20, 1949.  B. R. PURVIN  2,482,126
MACHINE TOOL CLAMPING MECHANISM
Original Filed Sept. 3, 1938  2 Sheets-Sheet 2
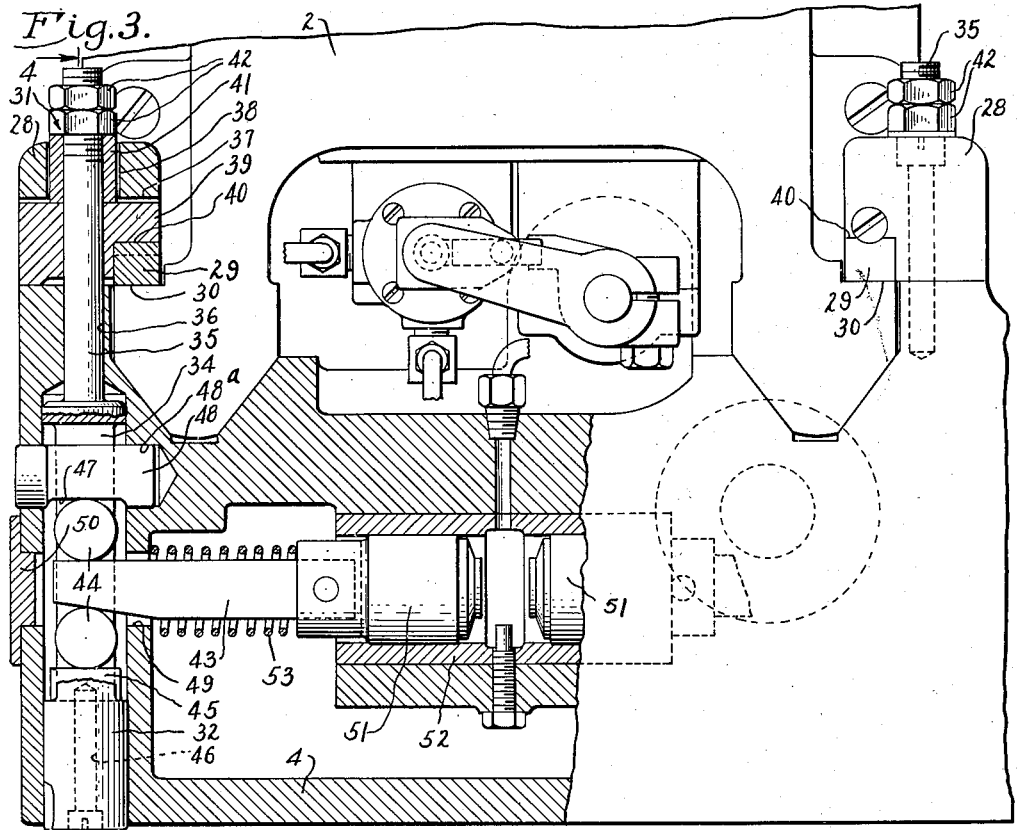
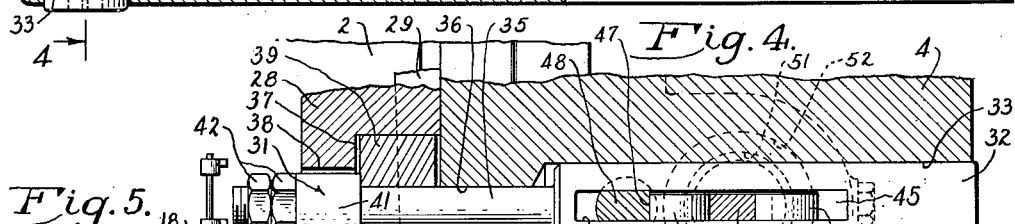
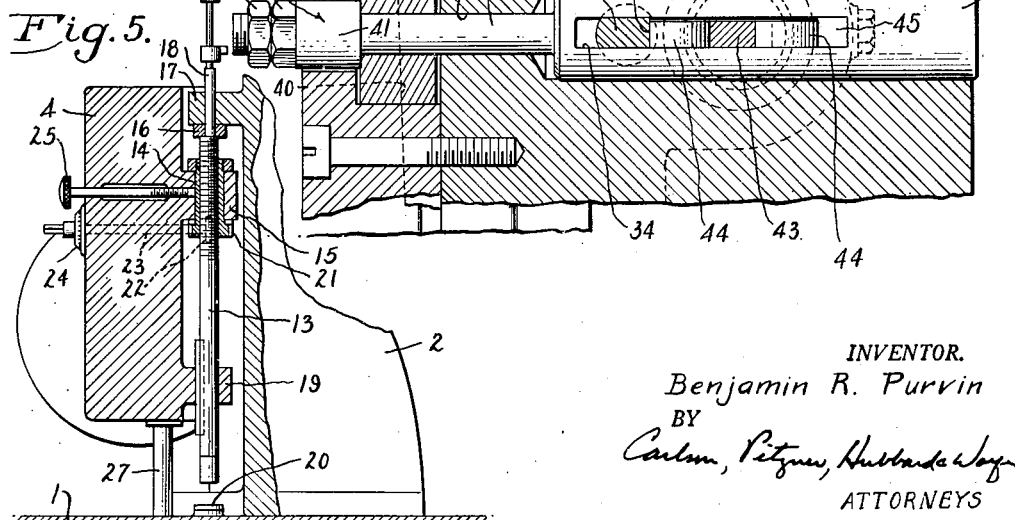
INVENTOR.
Benjamin R. Purvin
BY
ATTORNEYS Patented Sept. 20, 1949

2,482,126

UNITED STATES PATENT OFFICE 2,482,126

MACHINE TOOL CLAMPING MECHANISM

Benjamin R. Purvin, Detroit, Mich., assignor to Barber-Colman Company, Rockford, Ill., a corporation of Illinois.

Original application September 3, 1938, Serial No. 228,312, now Patent No. 2,356,796, dated August 29, 1944. Divided and this application August 22, 1944, Serial No. 550,559

6 Claims. (Cl. 29—1)

The present invention relates generally to improvements in machine tools, and has particular reference to a machine tool having new and improved clamping means for securing a translatable element in position of adjustment.

One of the objects of the invention is to provide a novel arrangement of hydraulic clamps operable simultaneously to secure the translatable element to a supporting column.

Another object is to provide a new and improved clamping mechanism which is simple in construction and which is powerful and efficient in operation.

Other objects and advantages will become apparent as the description proceeds.

In the accompanying drawings:

Figure 1 is a front elevational view of a machine tool having clamping means embodying the features of my invention.

Fig. 2 is a fragmentary diagrammatic representation of the hydraulic system.

Fig. 3 is a sectional view on an enlarged scale of the work slide clamping means.

Fig. 4 is a fragmentary vertical sectional view taken along line 4—4 of Fig. 3.

Fig. 5 is a fragmentary sectional view taken along line 5—5 of Fig. 1, and illustrating means for adjusting and positioning the work slide.

Referring more particularly to the drawings, the present invention is embodied in a hobbing machine of the type disclosed in my copending application, Serial No. 228,312, filed September 3, 1938, now Patent No. 2,356,796, issued August 29, 1944, of which the present application is a division.

The hobbing machine comprises a hollow base 1 and upright columns 2 and 3 are rigidly mounted respectively on opposite ends. A work slide 4 is mounted for vertical positioning on the front of the column 2, and has an integral over-arm 5 guided on the front of the column 3. Journaled in the slide 4 is a hollow work spindle 6 adapted to be connected to one end of a work arbor 7 supporting a gear blank W. The other end of the arbor 7 is adapted to be supported by a tailstock 8 mounted for adjustment on the underside of the over-arm 5. A hob slide 9 is mounted on the top of the bed 1 for travel axially of the spindle 6. A swivel plate 10 is mounted on the slide 9 for angular adjustment about a vertical axis, and adjustably supports a spindle slide 11. Journaled in the slide 11 is a spindle 12 adapted to support a cutting tool or hob T.

The work slide 4 is movable hydraulically either into an elevated inoperative position or a lowered operative position, and is adapted to be clamped hydraulically in the operative position. These positions are defined by a non-rotatable vertical screw 13 (see Fig. 5) threaded through a rotary nut 14 journaled in a lug 15 on the rear of the slide 4. The upper end of the screw 13 carries an abutment plate 16 adapted for engagement with the underside of a forwardly projecting lug 17 on the column 2 to define the inoperative position, and has an axial extension 18 of reduced diameter extending slidably through the lug. The lower end of the screw 13 is splined for axial movement through a lug 19 on the rear and adjacent the bottom of the slide 4, and is adapted for engagement with a positive stop 20 on the bed 1 to define the operative position. The screw 13 is vertically adjustable relative to the work slide 4 to establish precisely the desired depth of cut. Thus, a spiral gear 21 coaxial and rigid with the lower end of the nut 14 meshes with a spiral pinion 22 fixed on the inner end of a shaft 23 journaled in the slide 4 and extending therethrough to the front of the machine. A micrometer dial 24 is fixed on the front end of the shaft 23 to indicate the depth adjustment. A locking screw 25 is threaded through the slide 4 for engagement with the periphery of the nut 14 to secure the stop screw 13 releasably in position.

Vertical movement of the work slide 4 between the limit positions is obtained by a hydraulic cylinder and piston motor 26 (see Fig. 2) rigidly mounted on the base and having a vertical piston rod 27 extending upwardly into operative engagement with the bottom of the slide body.

The work slide 4 is confined for vertical movement against the column 2 by suitable gib plates 28 (see Figs. 3 and 4) bolted in position. Adjustably mounted in the plates 28 are suitable tapered gibs 29 engaging rear clamping surfaces 30 on the column. A plurality of hydraulically operable clamps 31, four in the present instance and located respectively adjacent the ends of the gib plates 28, are arranged to coact with the gibs 29 to secure the slide 4 rigidly in operative position. These clamps preferably are alike in constuction, and hence a description of one will suffice for all.

Each of the clamps 31 comprises a cylindrical plunger 32 which is slidable in a tranverse bore 33 opening to the front of the work slide 4, and which intermediate its ends is formed with a longitudinal diametrical slot 34. The rear end of the plunger 32 has an axial stem 35 which extends slidably through a bore 36 to the rear of the work slide 4, and then freely through a transverse notch 37 in the inner face of the gib plate 28 and a bore 38 opening from the notch to the rear of the gib plate. A clamping block 39 is slidably disposed on the stem 35 within the notch 37, and is formed in one end with a notch 40 interfitting with and engaging the taper gib 29. A collar 41 is slidably disposed on the stem 35 within the bore 38, and is confined against the rear of the block 39 by two lock nuts 42, whereby the block may be adjusted relative to the plunger 31.

Extending transversely through the slot 34 is a wedge member 43 in the form of a flat tapered bar adapted to impart a forward thrust to the plunger 31 to apply the clamp block 39. The wedge bar 43 is in antifriction bearing engagement at opposite sides with two rollers 44 disposed within the slot 34. One of the rollers 44 bears against a hardened block 45 removably secured by a screw 46 against the forward end of the slot 34. The other roller 44 bears against the forward edge 47 of a hardened pin 48 extending transversely through the bore 33 and the slot 34. The pin 48 is inserted in a transverse bore 48a in the side of the work slide 4, and is flattened to interfit slidably with the slot 34, thereby restraining the plunger 31 against rotation.

The wedge bar 43 extends into the bore 33 from the interior of the work slide 4 through a transverse bore 49 closed at the outer end by a cap 50, and is rigidly connected at the inner end to a piston 51 reciprocable in a hydraulic cylinder 52 adapted to receive pressure fluid. A coiled compression spring 53 engaging the piston 51 tends to retract the bar 43. It will be understood that when pressure fluid is supplied to the cylinder 52, the bar 43 will be forced outwardly, and through the rollers 44 rolling on the block 45 and the pin 48 will impart a powerful clamping thrust to the plunger 31.

The pistons 51 for the two upper clamps, and also the pistons for the two lower clamps, in each instance, are disposed in opposite ends of one cylinder 52. In addition to the four clamps for the work slide, a similar hydraulically operable clamp 54 is provided for securing the over-arm 5 to the face of the column 3. This clamp comprises a headed bolt (not shown) movable in a vertical T-slot 56 in the column 3 and connected to a plunger 31 operable by a hydraulic motor including a cylinder 52. The cylinders 52 for the five clamps may be connected in parallel as more fully described in connection with the hydraulic circuits so that the clamping pressure at all points is equalized.

The hydraulic actuator 26 for elevating and lowering the work slide 4 has upper and lower fluid supply lines 57 and 58. The line 58 is connected through a resistance valve 59 to a line 60, the purpose of this resistance valve being to hold up the slide 4 when fluid pressure is not available. The lines 57 and 60 are adapted to be reversibly connected respectively to a suitable source of pressure fluid (not shown) and exhaust, it being understood that when fluid is supplied to the line 60 the slide will be elevated, and when fluid is supplied to the line 57 the slide will be lowered.

The various clamps 31 and 54 for the work slide 4 are adapted to be applied simultaneously upon movement of the slide into its operative position. To this end, the line 57 to the upper end of the motor 26 has a branch connected through a resistance valve 61 to a line 62, this valve being adapted to pass fluid when the pressure rises above a predetermined amount, as it will after the slide 4 has come to rest in operative position. The line 62 is adapted to be connected by a valve 63 to a line 64 connected in common to all of the clamp cylinders 52. A hand lever 65 on the front of the slide 4 is available for operating the valve 63 which in one position serves to connect the line 62 to the line 64 to apply the clamps, and in the other position to connect the line 64 to an exhaust line 66 to release the clamps. Hence, the valve 63 affords means for releasing and applying the clamps at will when the slide 4 is held in lowered position.

The mechanism for adjusting and clamping the work slide is disclosed and claimed in my copending divisional application, Serial No. 98,929, filed June 14, 1949.

I claim as my invention:

1. In a machine tool, in combination, a base having a column with vertical parallel spaced ways, a slide reciprocable on the front of said ways, gib plates on said slide and confining said slide on said ways, taper gibs in said plates and engaging the rear of said ways, and a plurality of clamps for securing said slide in position of adjustment, each clamp comprising a reciprocable plunger in said slide having a longitudinal diametrical slot and having a clamping block adapted for coaction with the rear of the associated gib, a stop pin extending through said slot, a stop abutment in one end of said slot, a wedge bar extending transversely through said slot between said pin and abutment, antifriction rollers disposed against opposite sides of said bar and coacting with said pin and said abutment, spring means tending to retract said bar, and hydraulic means for actuating said bar against the action of said spring means to apply said clamping block.

2. In a machine tool, in combination, a base having a column with vertical parallel spaced ways, a slide reciprocable on said ways, gib plates on said slide and confining said slide on said ways, and a clamp for securing said slide in position of adjustment, said clamp comprising a reciprocable plunger in said slide and having a longitudinally facing abutment movable therewith, a fixed abutment in said slide in opposed relation to said first mentioned abutment, a clamping block on said plunger adapted for coaction with the rear of one of said ways, a wedge bar extending transversely of said plunger for coaction with said abutments, and hydraulic means for actuating said bar to apply and release said clamping block.

3. A clamping mechanism for an element reciprocable on a support comprising, in combination, a gib plate on said element and confining said element on said support, a taper gib in said plate and engaging said support, a reciprocable plunger in said element having a longitudinal diametrical slot and having a clamping block adapted for coaction with said gib, a stop pin supported in said element and extending through said slot, a stop abutment in one end of said slot, a wedge bar extending transversely through said slot between said pin and abutment, antifriction rollers disposed against opposite sides of said bar and coacting with said pin and said abutment, spring means tending to retract said bar, and means for actuating said bar against the action of said spring means to apply said block.

4. A clamping mechanism for an element reciprocable on a support comprising, in combination, a gib plate on said element and confining said element on said support, a reciprocable plunger in said element having a longitudinally facing abutment, an opposed abutment in said support, a clamping block on said plunger and adapted for coaction with said support to clamp said element in position, a wedge bar extending transversely of said plunger for coaction with said abutments to adjust said plunger longitudinally, and means for actuating said bar whereby to apply and release said block.

5. In a machine tool, in combination, a base, a machine element slidable on said base, and a clamping mechanism for securing said element in position of adjustment to said base, said clamping mechanism comprising a plunger reciprocably supported in said element and having a longitudinal slot opening transversely therethrough, a clamping block rigid with said plunger and movable therewith for coaction with said base to clamp said element to said base, a stop pin supported in said element and extending transversely through said slot, a stop abutment in said slot and disposed in opposed relation to said pin, a wedge bar extending transversely through said slot between said pin and abutment, antifriction rollers disposed against opposite sides of said bar and coacting with said pin and said abutment, and means for actuating said bar reversibly and including a hydraulic actuator for shifting said bar in a direction to apply a clamping pressure.

6. In a machine tool, in combination, a base, a machine element slidable on said base, and a clamping mechanism for securing said element in position of adjustment to said base, said clamping mechanism comprising a plunger reciprocably supported in said element and having a longitudinal slot opening transversely therethrough, a clamping block rigid with said plunger and movable therewith for coaction with said base to clamp said element to said base, a stop pin supported in said element and extending transversely through said slot, a stop abutment in said slot and disposed in opposed relation to said pin, a wedge bar extending transversely through said slot between said pin and abutment adapted upon movement in one direction to separate said pin and abutment so as to impart a clamping force to said block, and means for actuating said bar.

BENJAMIN R. PURVIN.

REFERENCES CITED

The following references are of record in the file of this patent:

UNITED STATES PATENTS

| Number | Name | Date |
| --- | --- | --- |
| 1,961,259 | Trosch | June 5, 1934 |
| 2,036,483 | Lawrence | Apr. 7, 1936 |
| 2,052,249 | Roehm | Aug. 25, 1936 |
| 2,123,825 | DeVlieg | July 12, 1938 |
| 2,146,446 | Schmidt et al. | Feb. 7, 1939 |
| 2,251,016 | Gallimore | July 29, 1941 |
| 2,355,677 | Ransome | Aug. 15, 1944 |